Sept. 28, 1943.　　　　A. LONGORIA　　　　2,330,503
PROCESS OF WELDING METALS ELECTRICALLY
Filed April 3, 1942　　　7 Sheets-Sheet 3
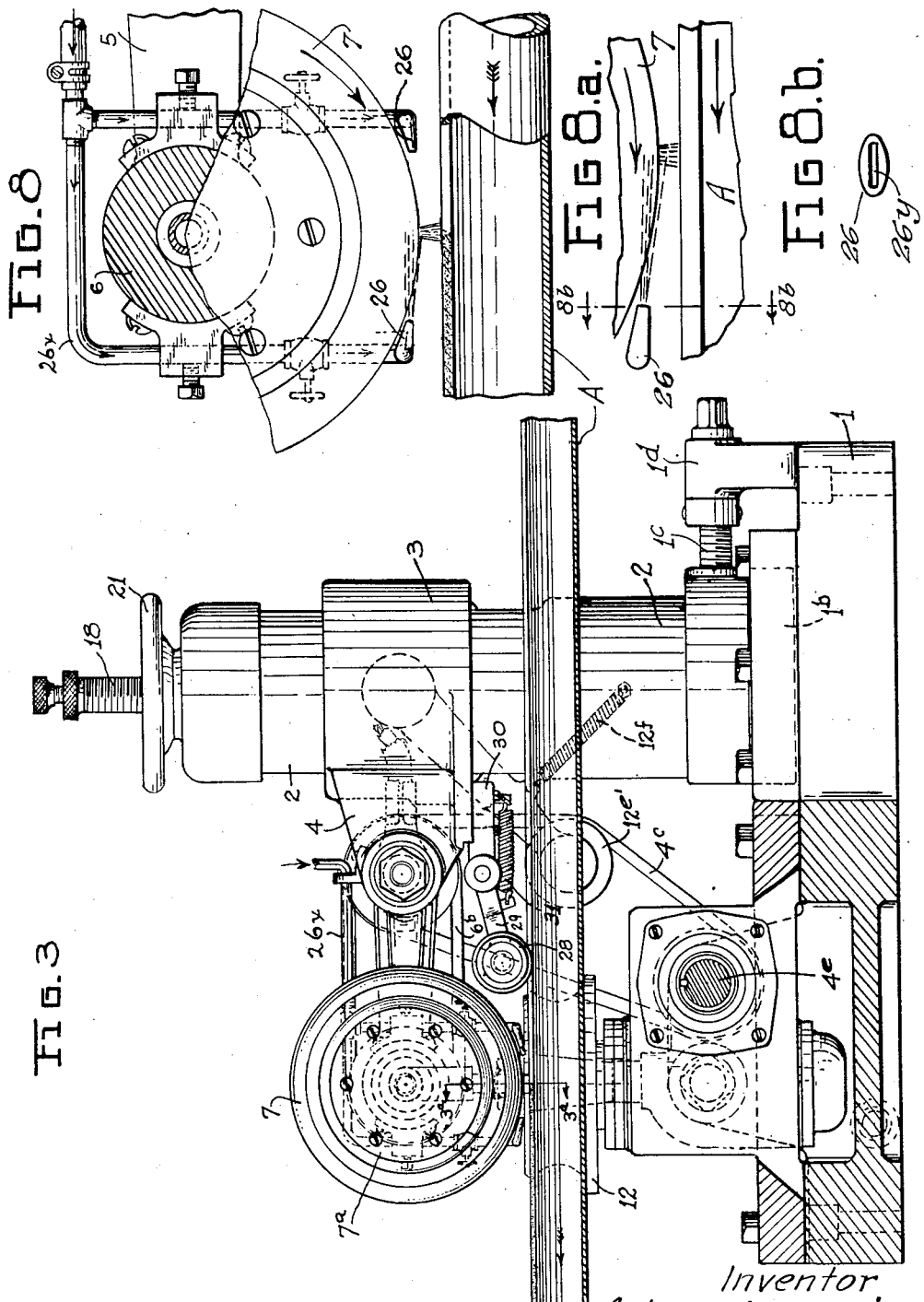
Inventor.
Antonio Longoria
By John E Jackson
Attorney

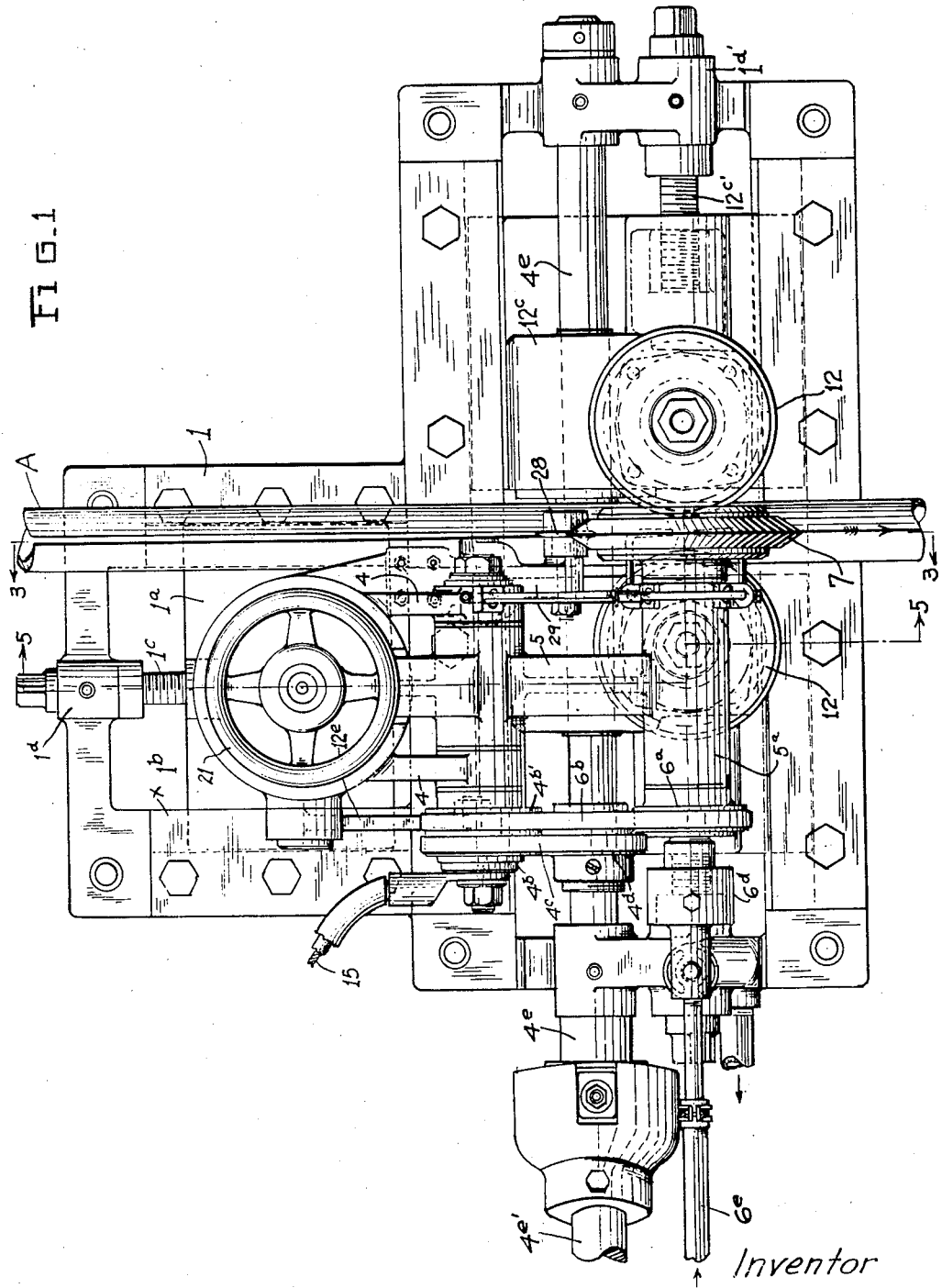

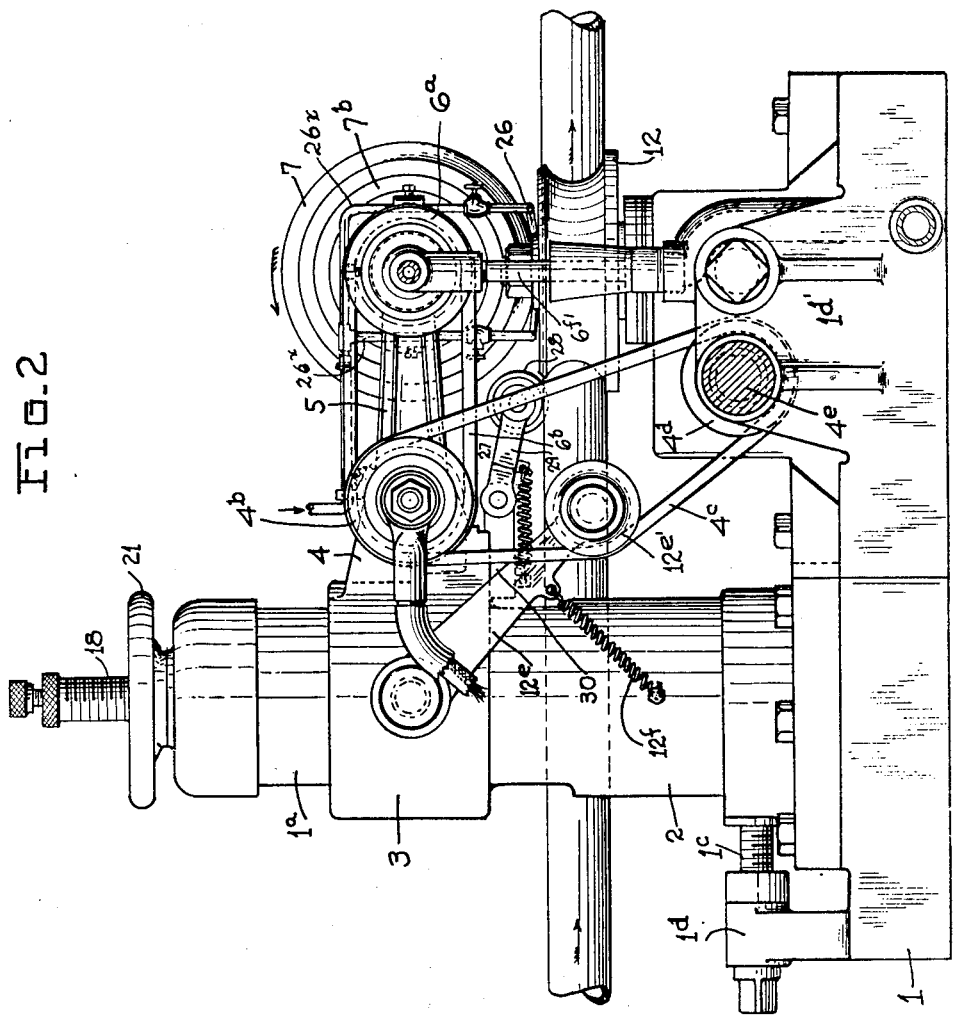

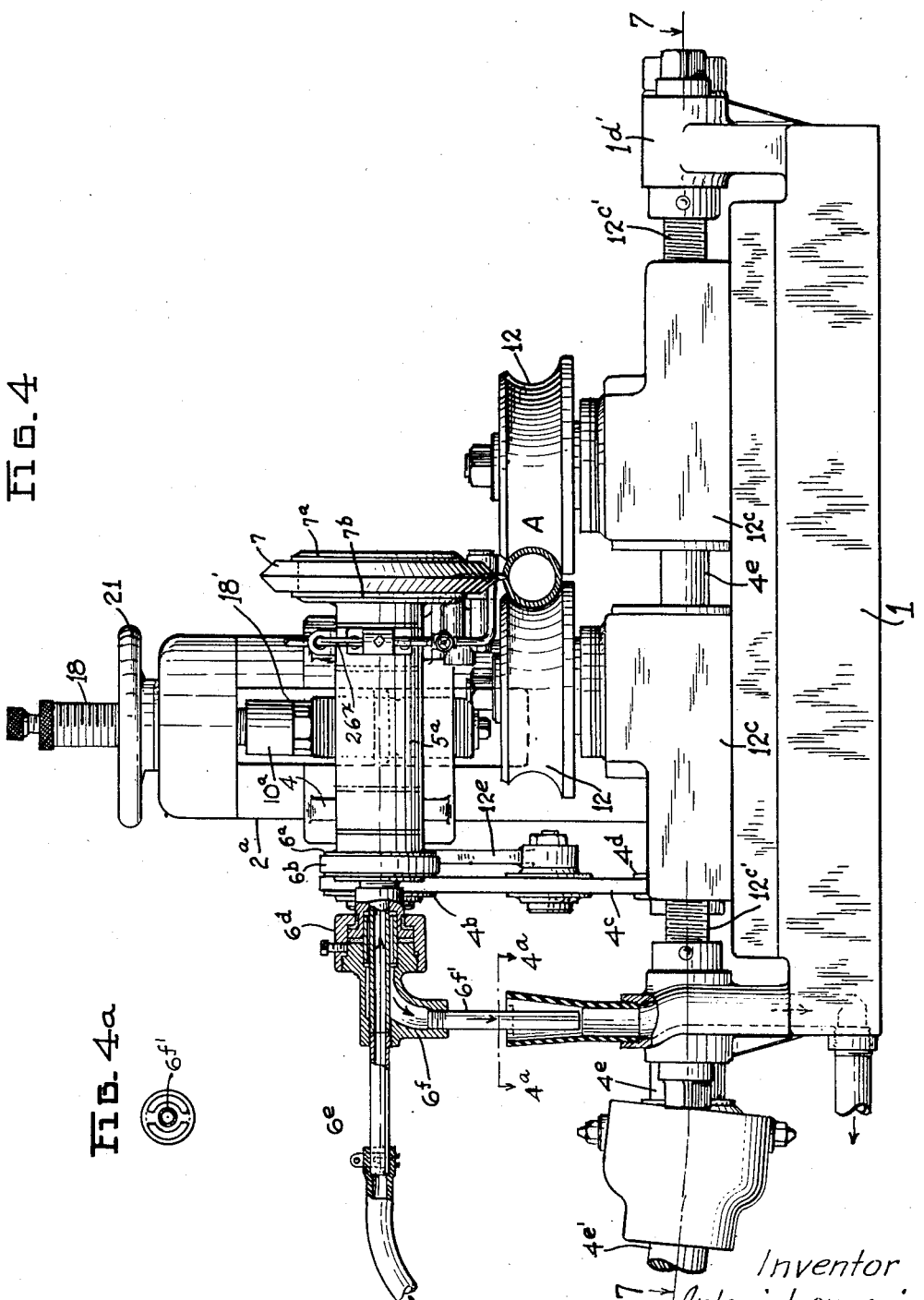

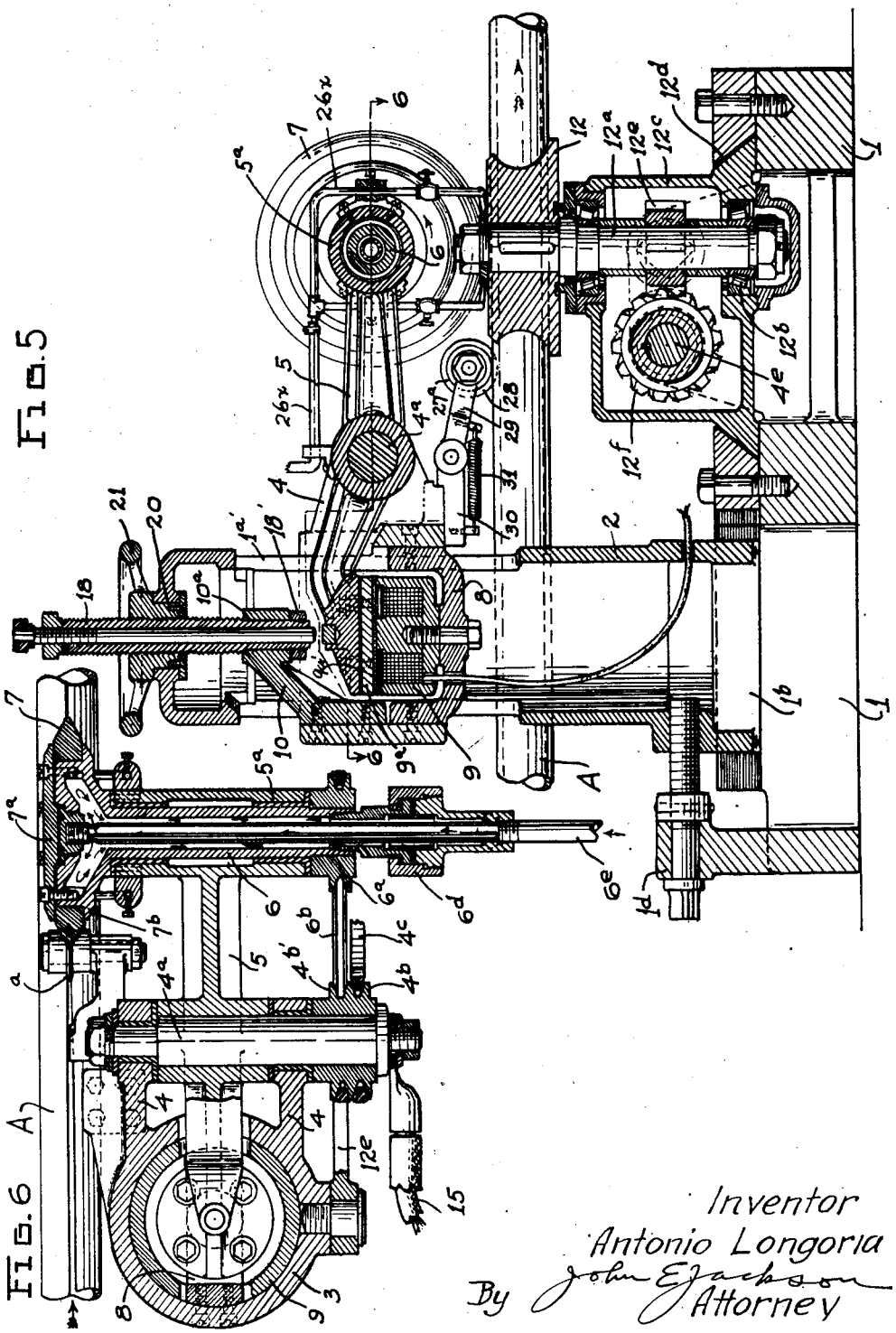

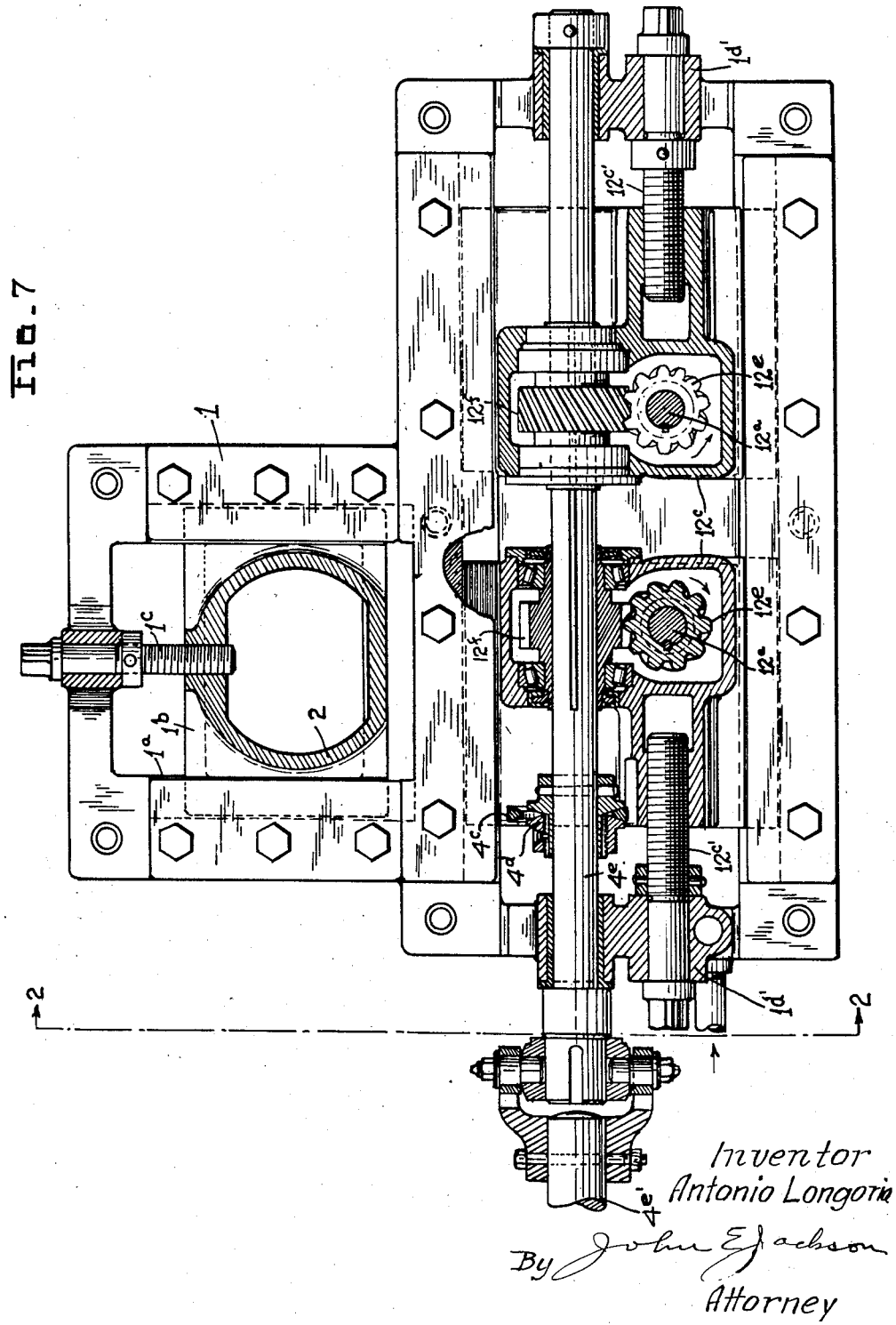

Sept. 28, 1943. A. LONGORIA 2,330,503
PROCESS OF WELDING METALS ELECTRICALLY
Filed April 3, 1942 7 Sheets-Sheet 7
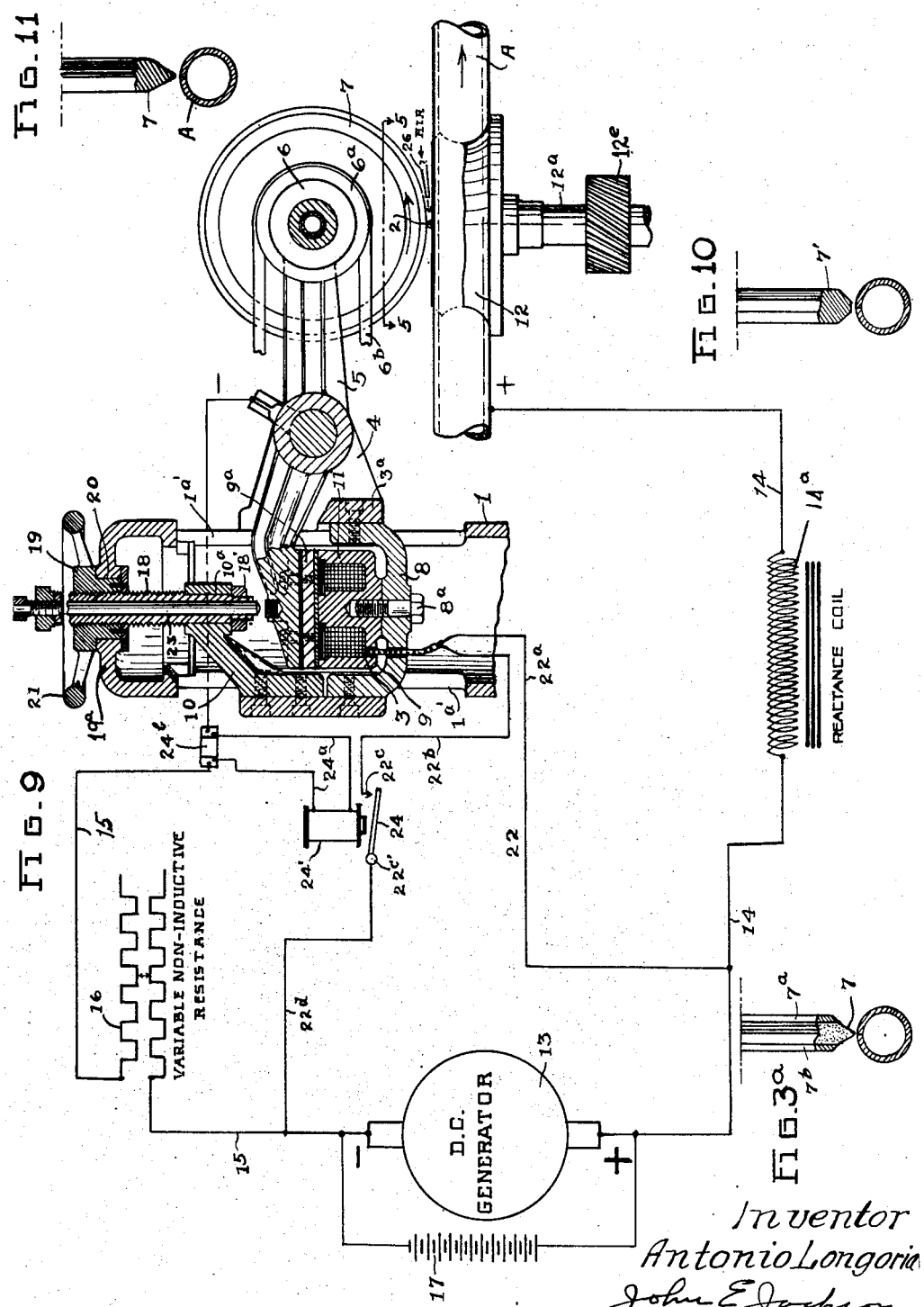
Inventor
Antonio Longoria
By John E. Jackson
Attorney Patented Sept. 28, 1943

2,330,503

UNITED STATES PATENT OFFICE 2,330,503

PROCESS OF WELDING METALS ELECTRICALLY

Antonio Longoria, South Euclid, Ohio

Application April 3, 1942, Serial No. 437,600

8 Claims. (Cl. 219—10)

This invention relates to a process of welding metal electrically, more particularly a welding process of the electric arc type. Heretofore, in electric welding, as well as in other methods of welding, it has been found necessary to heat large areas of the metal sections or work to be welded to a high degree of temperature, that is, that degree of temperature wherein a large quantity of the metal was fused, and to simultaneously effect pressure between the sections or work. In such processes danger of expansion and contraction of the work was present. Furthermore, a large supply of current was required to heat the work to the desired temperature. In welding certain metals or alloys thereof, danger of oxidation was a factor which added to the complexity of welding. Also, apparatus of which I have knowledge, was expensive and in some instances relatively slow in carrying out the welding process, in machines for arc welding the speed of operation being approximately 6 to 10 feet per minute. In my improved process, the weld is continuous as compared to what is known as stitch welding, spot welding or percussion welding. The apparatus is materially simplified and a small amount of current is required as welding is effected without heating the metal over a large area, one object of the invention being to provide an improved process wherein welding is effected in a rapid manner and without unduly heating the work or the molecules thereof, whereby danger of setting up undue stresses in the work is avoided and current consumption is reduced to a minimum to produce the welding operations economically. Furthermore, in welding at a reduced temperature, as herein disclosed by me, the electrode may be maintained at a low temperature so that danger of giving off infrared rays therefrom is minimized or avoided.

My process is adapted for welding various metals, both similar or dissimilar in kind.

One object of the invention is to provide an improved process of welding wherein the edges of the work are heated by a direct current upon which is impressed a high-frequency characteristic, the effect of which is to weld the edges together.

Another object of the invention is to provide an improved process of welding wherein the electric arc is controlled or stabilized, that is, the gap between the electrode and the work is bridged by an arc which is at all times, perpendicular to the latter and follows the path of minimum length between the electrode and the work.

A further object of the invention is to provide an improved process of welding wherein the resulting burr is materially reduced and in some instances substantially eliminated.

Another object of the invention is to provide an improved process of welding capable of welding metal of different thicknesses either in butt or lap relation; for example, since in my process, in its broader aspects, pressure between the work edges to be welded is not essential, thin sheets of one-thousandth of an inch thick may be readily welded edge to edge or in lapped relation.

Another object of the invention is to provide an improved process of butt or lap welding metals without the supply of welding material.

Other objects of the invention will be apparent to those skilled in the art to which my invention relates from the following description taken in connection with the accompanying drawings, wherein Figure 1 is a plan view of a machine embodying my invention and capable of carrying out the steps of my process.

Figure 2 is a side elevation, being a section on the line 2—2 of Figure 7.

Figure 3 is a section on the line 3—3 of Figure 1.

Figure 3a is a fragmentary section on the line 3a—3a of Figure 3.

Figure 4 is a front elevation.

Figure 4a is a section on the line 4a—4a of Figure 4.

Figure 5 is a section on the line 5—5 of Figure 1.

Figure 6 is a section on the line 6—6 of Figure 5.

Figure 7 is a section on the line 7—7 of Figure 4.

Figure 8 is a fragmentary section illustrating certain parts shown in Figure 3 (somewhat enlarged), portions of the parts being cut away.

Figure 8a is an enlarged diagram illustrating the relation of the arc stabilizing air jet to the rotary electrode and the work. Figure 8b is a detail showing the outlet orifice for the air jet.

Figure 9 is a fragmentary view partly diagrammatic.

Figures 10 and 11 are views similar to Figure 3a.

In carrying out my process I provide a suitable electrode electrically connected to one side of an electric circuit and a support for the work which, through the support, is connected to the other side of the circuit. The current for the circuit is supplied by a suitable source, preferably a D. C. generator and controlled by a suitable variable resistance, preferably of the non-inductive type, the supplied current, through an electric arc, serving to heat the opposed edges or surfaces of the metal at the point of welding, to a temperature where fusion of the opposing surfaces starts. Suitable means are provided for supporting the work and causing relative bodily movement between it and the electrode, while maintaining contact of the metal edges at or immediately adjacent the point where welding takes place. The rate of relative movement is related to the amount of current supplied to the electrode and work, in order that the molecular structure of the metal edges may be brought to the predetermined fused, critical condition and temperature at the instant the welding operation is to be completed. In addition to such relative bodily movement, the electrode is rotated about its axis, for a purpose later set forth. Such rotation is advantageous to maintain the periphery of the electrode cool, although auxiliary cooling means, as herein shown, may be used where conditions make it desirable, as overheating of the electrode will cause emission of infrared rays and adversely affect the welding operations.

Next, I establish an arc between the electrode and the work. The space or gap between the electrode and the work bridged by the arc may vary in length with different metals; it is also dependent upon the thickness of the metals and in some instances upon the relative movement between the work and electrode; but the space or gap is preferably maintained at a predetermined minimum length, as later set forth, and in order that the arc may be readily stabilized. The arc is produced by causing contact of the electrode with the work to close the electrical circuit and then separating the electrode from the work a predetermined distance, the electrode and metal edges being arranged so that the resulting electric arc engages both work edges to heat the molecular structure thereof as the work and electrode bodily move one relative to the other. In carrying out these steps, (a) the electrode is related to the work edges to be welded from end to end thereof so that the electric arc may heat the exposed molecules thereof as already set forth and (b) the molecular structure is heated to the predetermined temperature faster than the oxygen or other element of the gaseous fluid, which is utilized by me as later set forth, can attack or affect the metals while being welded, to any substantial degree. The molecular structure of the metal edges or weldable surfaces while in the fused critical condition and relation, is subjected to an electric shock which serves to unite or weld together the metal edges. This step of causing an electric shock is effected by passing a uni-directional current of relatively high frequency through the edges of the work while impinging a jet of air onto a rotating electrode immediately ahead of the arc. The pulsating, uni-directional current is derived from modulating the current flowing in the arc circuit in such a manner as to produce vibrations or fluctuations of an entirely different order from those arising from generative or arc causes. I have found that the employment of a jet of air in connection with one electrode of the arc in a manner, as hereinafter disclosed, has the capabilities of imparting to the current the desired modulated characteristics. I have found that for the best welding conditions coolness in the zone of the arc is essential and for this reason I prefer to employ a rotary electrode of a kind that will permit the arc to be struck from its periphery and which may be rotated so as to prevent heating of any portion of the electrode to an undesirable degree. In such rotative movement of the electrode, the arc tends to follow the electrode periphery as contiguous portions thereof recede from the work. To overcome this tendency in carrying out this step of my process, I provide means for controlling or stabilizing the electric arc, to maintain it at the point of welding in a predetermined relation to the work, that is, bridging the space or gap between the electrode and work and perpendicular to the latter, so that the arc will be of minimum length and will not flex forwardly of the work. As the molecular structure at the edges of the metal is in contact and in a critical condition at a temperature where fusion starts, the high frequency pulsations impressed on the current are effective to cause a sudden vibration of the molecules, thus destroying or breaking up any oxidized films on the surfaces of the fused metal; these vibrations in turn causing an intermingling and union of the molecules with the result that the edges of the metal become united into a homogeneous mass or welded relation without the use of any flux. But it is not intended that the invention is to be limited to the elimination of a flux, as a flux may be found desirable in welding various metals; for example, where the metal contains zinc. As the current is flowing in one direction, the welding is therefore effected by a uni-directional current having high frequency characteristics.

The stabilizing means for the arc preferably consist in directing upon the welding electrode at the point where the arc contacts the contiguous portions of the electrode periphery a jet of fluid in the gaseous state, preferably air, under a predetermined pressure and volume. The air or gas pressure and the direction in which the supplied air is applied, is utilized to control and stabilize the arc in relation to the speed of relative bodily movement between the electrode and the work and movement of the electrode periphery, so that the arc will be of minimum length and bridge the space or gap in substantially a straight path perpendicular to the work, as above set forth. The use of air is advantageous as it assists in maintaining the periphery of the electrode cool and hence tends to eliminate the emission of infrared rays, which I have found to be deleterious to the smooth continuous operation of the arc. However, the function of the jet of air according to welding operations carried out by me, is that it stabilizes the arc thus imparting the desired modulations to the current referred to hereinbefore as vibrations or fluctuations upon which the success of my invention depends.

In the drawings, which illustrate one form of mechanism adapted for carrying out my process, 1 indicates a frame having suitable guides 1a extending parallel to the direction of movement of the work A and slidably supporting a base plate 1b to which is integrally connected a hollow column 2. The outer wall of the column 2 forms a guideway 2a for a head 3 to permit the latter to be raised and lowered. The column 2 and parts carried thereby are adjustable on the guides 1a by means of a screw 1c threaded into the rear wall of the column 2 and rotatably mounted in a hollow boss 1d provided on the frame 1. The head 3 is provided with a pair of arms 4, which support a shaft 4a. The shaft 4a at one end outwardly of the adjacent arm 4 loosely supports a pair of connected together driving elements, illustrated as pulleys 4b, 4b'. The pulley 4b is driven by an endless belt or chain 4c engaging a pulley 4d on a shaft 4e. The shaft 4e is mounted in suitable bearings in the frame and driven through a universal joint by a shaft 4e', which is driven in any suitable manner. Fulcrumed on the shaft 4a between the arms 4 is a rocker 5, having at its outer end a hollow boss 5a in which a shaft 6 rotates. An electrode 7, formed of conducting material, is secured to the other end of the shaft 6. The electrode 7 shown in Figure 6 consists of an annular member clamped by suitable bolts between a copper disk 7a and the flange on the enlarged head 7b provided on the adjacent end of the shaft 6 (see Figure 6). The opposite end of the shaft 6 is provided with a pulley 6a, engaged by an endless belt 6b, which is driven by the pulley 4b'.

The shaft 6 and head 7b are of hollow formation to receive a pipe 6c, mounted at its inner end in the shaft head and extending into and through a suitable coupling 6d to which is connected a pipe 6e connected with a water supply, the coupling 6d having relatively rotatable elements to permit rotation of the shaft 6 and pipe 6c. As shown in Figure 6, the inner end portion of the pipe 6c is formed with discharge openings so that the water is supplied to the chambers in the head 7b and returns through the shaft 6 and coupling 6d to an outlet 6f having a discharge pipe 6f' (see Figure 4).

As mentioned hereinbefore, the electrode 7 is continuously rotated during the welding operation to reduce the unit area heat conditions at the periphery of the electrode and hence to prevent the latter from overheating. The electrode 7 is driven at such speed that the speed of its periphery preferably substantially equals the speed of the work, its surface moving in the same direction as the work. The head 3 is provided with a cross member 8, shaped to form a support for the coil of an electro-magnet 9, the armature 9a for the magnet being secured to the inner end of the rocker 5. The column 2 is cut away or formed with openings 1a' to permit the inner end of the rocker 5 to extend into operative relation to the coil of the magnet 9 and also to permit an arm 10, to which reference is later made, to extend into the interior of the column 2 above the head 3. The coil of the magnet 9 is mounted in an annular recess of a housing 11, which is secured to the cross member 8 by a cap screw 8a. By preference, the inner end of the rocker 5 is provided with a face plate formed of soft iron to permit magnetic attraction when the coil of the magnet 9 is energized and a plate 9a' formed of brass or other non-magnetic material (these parts being suitably bolted to the inner end of the rocker) to separate the armature from the magnet core, whereby the residual magnetism in these parts does not affect their operation when the coil is deenergized.

The form of construction herein shown for illustrative purposes is arranged to support, guide and feed the work A relative to the electrode 7, the work A being shown as a pipe having seam edges in butt relation to be welded. In this embodiment two driven rolls 12, which are disposed on opposite sides of the pipe A, and serve the dual function of supporting and feeding the pipe, as well as guiding it, but it will be understood that the construction of the support for the work and the means for feeding and guiding it will depend upon the shape of the work or sections to be welded. The rolls 12 are driven at any desired speed, the driving means therefor and the electrode 7 being controlled and coordinated so that the surface speed of the electrode and movement of the pipe A relative to the electrode are substantially the same, although this speed relation is not essential in carrying out the welding operation, as the speed of either may be changed to meet varying conditions. The rolls 12 are removably mounted on supporting shafts 12a so that rolls having active surfaces corresponding to pipes of different diameters or work of a different cross sectional shape may be provided. The roll shafts 12a are mounted in anti-friction bearings 12b provided in casings 12c, which are adjustable in guides 12d on the frame 1 (see Figure 5). The casings 12c are adjustable toward or from each other, whereby the rolls may be fixed in adjusted position and spaced to maintain the edges of the work to be welded in contact, as such edges pass the point at which welding is effected. Each shaft 12a is provided with a spiral gear 12e in mesh with a worm 12f fixed to the shaft 4e. As shown in Figure 7, the worms 12f are splined to the shaft 4e and the hubs thereof are mounted in anti-friction bearings provided in the casings 12c so as to permit their adjustment with the latter. Each casing 12c is adjusted in its guides 12d by means of a screw 12c' rotatably mounted in hollow bosses 1d' provided on the frame 1. 12e indicates an arm pivoted on the head 3 and carrying at its outer end a loosely rotatable pulley 12e' in engagement with the belt 4c, the arm 12e being biased in one direction by a spring 12g to keep the belt 4c taut.

13 indicates a generator, that is, a D. C. generator, one side thereof being connected by a lead 14 to the pipe A or grounded through the work support and the other side being connected by a lead 15 to the electrode 7, that is, grounded through the rocker which is insulated in any well known manner from the arms 4 and frame 1 (see Figure 6). As shown, the positive side of the circuit is connected to the work A, but it may be found desirable to reverse the current and connect the negative side of the circuit to the work. 16 indicates a suitable resistance for regulating the amount of current supplied in the circuit, the resistance preferably being of the variable, non-inductive type. Means may be provided for eliminating fluctuations in the circuit. Such means may consist of a suitable condenser, but I have illustrated these means as a storage battery 17 connected in the circuit in parallel to the generator 13.

The head 3 is adjustable on the column 2 so as to provide any predetermined width of air gap between the work A and the electrode 7. For this purpose, the arm 10 terminates in a hollow boss 10a through which extends a tube 18, the latter carrying at its lower end a nut 18' to engage the lower side of the boss 10a. The upper portion of the tube 18 is externally threaded and extends through a nut 19, rotatably mounted in an opening 20 formed in the top wall 19a of the column 2. The nut 19 is provided with annular shoulders in engagement with the opposite faces of the top wall 19a to prevent endwise movement of the nut. The nut 19, on its outer end, is provided with a wheel 21 or other device for rotating it, which operation serves to raise or lower the head 3 on the guideways 2a.

As already set forth, the electrode is mounted on the rocker 5, the rocker permitting the electrode 7, when starting the welding operation (a) to normally engage the work to complete the electric circuit and (b) to then move away from the work, whereby the welding arc is struck or formed across the resulting air gap. This movement of the rocker 5 is effected by the electromagnet 9, by the closing of a circuit 22, later referred to. By preference, means are provided between the rocker 5 and head 3 to adjustably regulate the rocking movement of the rocker. In the illustrated form of construction these means consist of a rod 23 slidably and rotatably fitting the tube 18 and extending therethrough, the lower end of the rod being disposed in spaced relation to the inner end of the rocker. The upper end portions of the rod 23 and tube 18 have screw threaded engagement with each other, so that by rotating the rod (its upper end being shaped to take a suitable tool for this purpose) its lower or free end may be moved toward or from the adjacent end of the rocker and thus regulate the movement of the latter. It will be understood that through the adjustment of the head 3 and adjustment of the rod 23, the necessary contact of the electrode with the work, to complete the electrical circuit in striking the arc is effected and any desired predetermined length of air gap between the electrode and the work may be provided.

The circuit 22 comprises a lead 22a from one end of the coil of the magnet 9 and connected to the lead 14, a lead 22b from the other end of the magnet coil and connected to a contact 22c of a switch 24 and a lead 22d connecting the other contact 22c' of the switch to the lead 15. The arm of the switch 24 constitutes the armature of an electro-magnet 24', the coil of which is connected by leads 24a to a shunt 24b provided in the lead 15, whereby a small amount of current is taken from the main circuit. Accordingly, when the main circuit is closed, the coil of the electro-magnet 24' is energized and operates the switch 24 to close the separate circuit 22, the effect of which is to energize the coil of the electro-magnet 9 and operate the rocker 5, whereby the electrode 7 is moved away from the work to establish the welding arc. The electrode 7 will be held in operative position by the magnet 9 as long as the main circuit remains closed. In the event the arc becomes broken, the main circuit is opened and the coils of the magnets 24' and 9 become deenergized. Accordingly, the rocker is released, allowing the electrode 7 to again make contact with the work and reestablish the welding arc in the manner already set forth.

To control and stabilize the welding arc I direct a jet of air in a direction opposite to the direction of travel of the work thus opposite to the direction of rotation of the circular electrode and onto the periphery thereof at a tangent thereto just ahead of the arc. The air is supplied in a predetermined volume and under a predetermined pressure.

The pressure of the air supplied to the electric arc may be regulated in any desired manner, to provide a predetermined pressure and volume, or either thereof, so as to stabilize the arc and prevent it from following the periphery of the electrode, as well as from flexing, flaring or spreading along the edges being welded in either direction or laterally thereof.

The air is supplied by a jet 26 whose discharge end is in close relation to the electrode 7 and is so positioned as to direct air against or upon the periphery of the electrode immediately ahead of the arc and in a direction opposite to the travel of the work and the rotation of said electrode. The supply pipe 26x for jet 26 is provided with a suitable cut-off valve whereby the supply of air can be shut off when the machine is not in operation. Jet 26 may be mounted for adjustment vertically to take care of different size electrodes.

The outlet orifice 26y from which the air jet emanates extends laterally of the line of weld. As shown in Figure 8b said lateral orifice is formed by flattening the extremity of the jet nozzle 26. Thus a wide thin jet of air is discharged in the exact critical manner described, substantially tangent to the rotating electrode and approximately perpendicular to the arc.

In Figure 9, the pipe A is shown being fed toward the right and the electrode 7 being rotated counter-clockwise. Under normal conditions, with the work and electrode moving in the directions indicated, the electric arc would have a tendency to follow the periphery of the electrode, but such tendency is counteracted by the air jet positioned at the right of the electrode, as viewed in Figures 2, 3 and 4. Ordinarily only one single jet is used at a given time, the direction thereof being opposite to that of the travel of the work and substantially perpendicular to the arc.

Figure 10 illustrates an electrode, its periphery 7' consisting of a flat face which extends to either side of the edges to be welded, the purpose of such face being to provide a wide arc transversely of the edges to insure contact of the arc with both thereof.

Figure 11 illustrates a different form of electrode, the periphery of which tapers to a relatively narrow edge. The electrodes herein shown may be formed of copper, carbon or other suitable material and shaped in cross section to suit varying conditions or kinds of metals to be welded.

In my construction of apparatus and process the electric arc serves to heat only the molecules of the metal along the edges of the work at the point of welding. Accordingly, a relatively small amount of current is required and this is advantageous from an economical standpoint as well as eliminating the heating of the work unduly at either side of the seam. From the foregoing description it will be noted that welding is effected without supplying any welding material or fluxing agent.

In carrying out operations to weld the edges of the thin sheet metal, since the amount of current required is very small, I prefer to connect in the circuit, in series, preferably between the work and the source of current supply, a reactance coil 14a, which serves to assist in striking the arc and also insures the maintenance of the arc as well as to intensify it. This adaptation or arrangement is illustrated in Figure 9.

It will be noted that in my process the metal along the edges of the work is utilized to form the weld, so that no other metal is supplied for this purpose. Furthermore, the heating and welding step is accomplished without affecting the chemical composition of the metal or metals or that portion of the metal which forms the weld. This is particularly advantageous in welding stainless steel since that portion of the metal constituting the weld will not rust when exposed to the elements.

27 indicates as an entirety a guide means for maintaining alinement between the electrode and the work edges. These means consist of a roller 28 rotatable on an arm 29 which is pivoted on a bracket 30 carried by the head 3. The roller 28 runs in the seam of the work, its periphery being tapered so as to engage the edges of the work seam, and accordingly maintains the electrode in alinement with the seam as the work A moves relative thereto. As shown, the roller is mounted in close relation to the electrode and is preferably normally biased into work engagement by a spring 31.

Since the weld effected by my method herein disclosed does not require the addition of any extraneous metal or the use of a fluxing agent, the practice may be defined as an autogenous method of welding. Microscopic examination of work welded by the disclosed method establishes the fact that the metal at the zone of the weld is of the same chemical composition as that of the original or parent metal. Also it has been determined that the metal of the weld is not made brittle by the welding operation. Work welded by the disclosed method has been tested by the so-called "cup test," which involves forcing a rounded die member into contact with the work at the point of weld and forcing the work into the cup-like die cavity. Such cup-test has shown the weld effected by my invention is ductile since the weld metal has been drawn without fracture.

To those skilled in the art to which my invention relates, many changes in construction and widely differing embodiments and applications of the invention will suggest themselves without departing from the spirit and scope of my invention. The disclosures and the description herein are purely illustrative and are not intended to be in any sense limiting.

What I claim is:

1. The art of autogenous electric arc welding, comprising effecting a relative movement between juxtaposed pieces of work to be welded and a circular electrode, establishing a unidirectional electric current flow through the electrode and the work across an arc between them, causing the electrode to rotate in the direction of movement of the work, directing a gaseous fluid onto the electrode at the point of source of the arc and in a direction opposed to that in which the work is traveling and substantially perpendicular to a line passing through the welding arc normal to the work, the arc thus being stabilized and maintained continuous while the work pieces are being autogenously welded together.

2. The art of autogenous electric arc welding, comprising effecting a relative movement between juxtaposed pieces of work to be welded and a circular electrode rotating in the direction of movement of the work, establishing a unidirectional electric current flow through the electrode and the work across an arc between them, directing a gaseous fluid onto the rotating electrode at the point of source of the arc and in a direction opposed to that in which the work is traveling and substantially perpendicular to a vertical line passing through the welding arc to impart a high frequency characteristic to the said current and to stabilize the arc and maintain it continuous while autogenously welding said pieces to one another.

3. The art of autogenous electric arc welding, comprising effecting a relative movement between the work to be welded and a rotating circular electrode, the work being moved in a plane, establishing a direct current arc between the periphery of the electrode and the work, directing a gaseous fluid stream in a line substantially parallel to the plane of movement of the work in a direction opposite to that in which the electrode is rotating and onto the electrode adjacent the point of source of the arc so as to effect stabilization of said arc.

4. The method of claim 3, characterized in that said fluid stream flows in a line about perpendicular to the arc.

5. The method of claim 3, characterized in that said fluid stream is ejected from an orifice thinner than it is wide and disposed transversely to the line of weld, and wherein said fluid stream flows in a direction counter to that in which the work is traveling while being welded.

6. The method of claim 3, characterized in that said fluid stream is ejected onto the rotating circular electrode in a line substantially parallel to the face of the work to be welded and in a direction opposite to the travel of the work.

7. The herein disclosed process of autogenous welding which comprises feeding the work in a plane past a revolving circular electrode in such manner that juxtaposed edges of the work pieces to be welded are aligned with the periphery of the electrode, supplying direct electric current to the electrode and the work, maintaining a welding arc therebetween, directing a fluid in a gaseous state under predetermined pressure in a line substantially parallel to the plane of feeding movement of the work and in a direction opposite to the travel of the work and the rotation of the electrode at a tangent thereto just ahead of the arc source and substantially perpendicular to said arc to control and stabilize the action thereof.

8. The art of autogenous electric welding which comprises propelling juxtaposed pieces to be welded through a common plane past a rotating circular electrode and in spaced relation thereto, establishing a flow of unidirectional electric current through said electrode and said work pieces via a welding arc struck between the electrode and the work pieces, directing a jet of air in a thin flat stream substantially parallel to the plane of work and in a direction opposite to the travel of the work and the rotation of the electrode and onto the periphery thereof at a tangent thereto and substantially perpendicular to said arc to control and stabilize the same and in order to maintain a minimum arc length between the electrode and the work.

ANTONIO LONGORIA.